Figure 1:
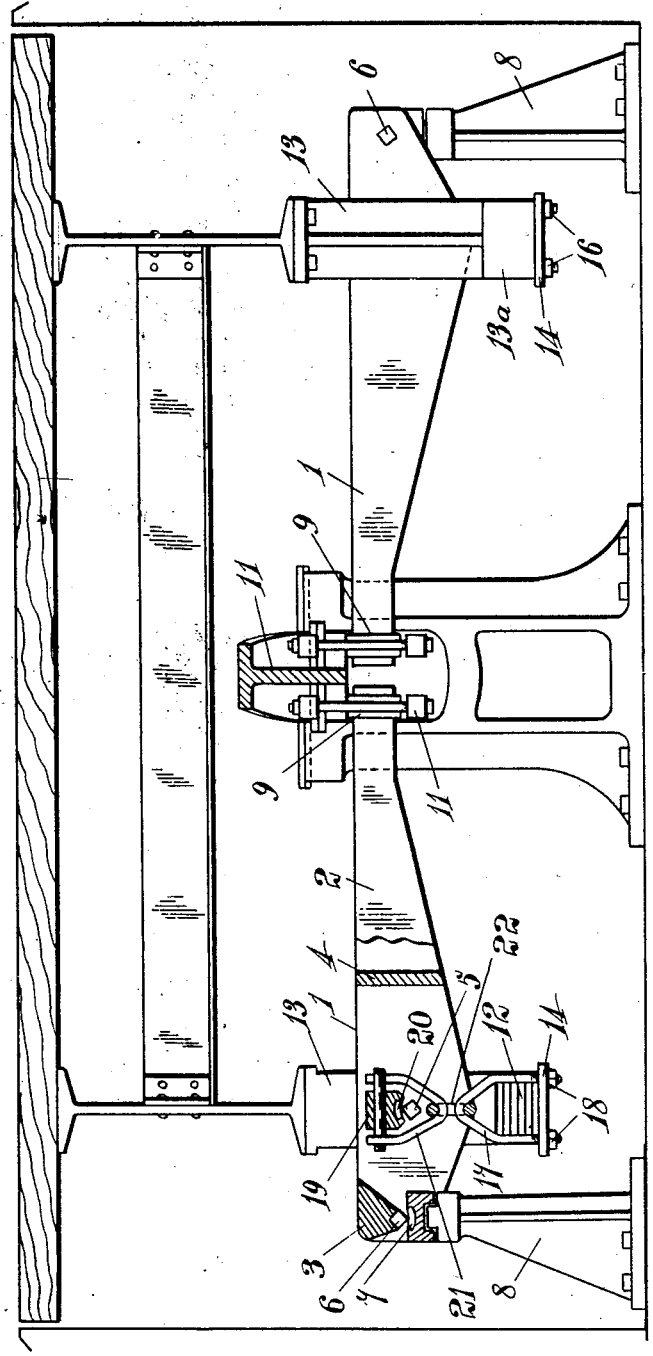

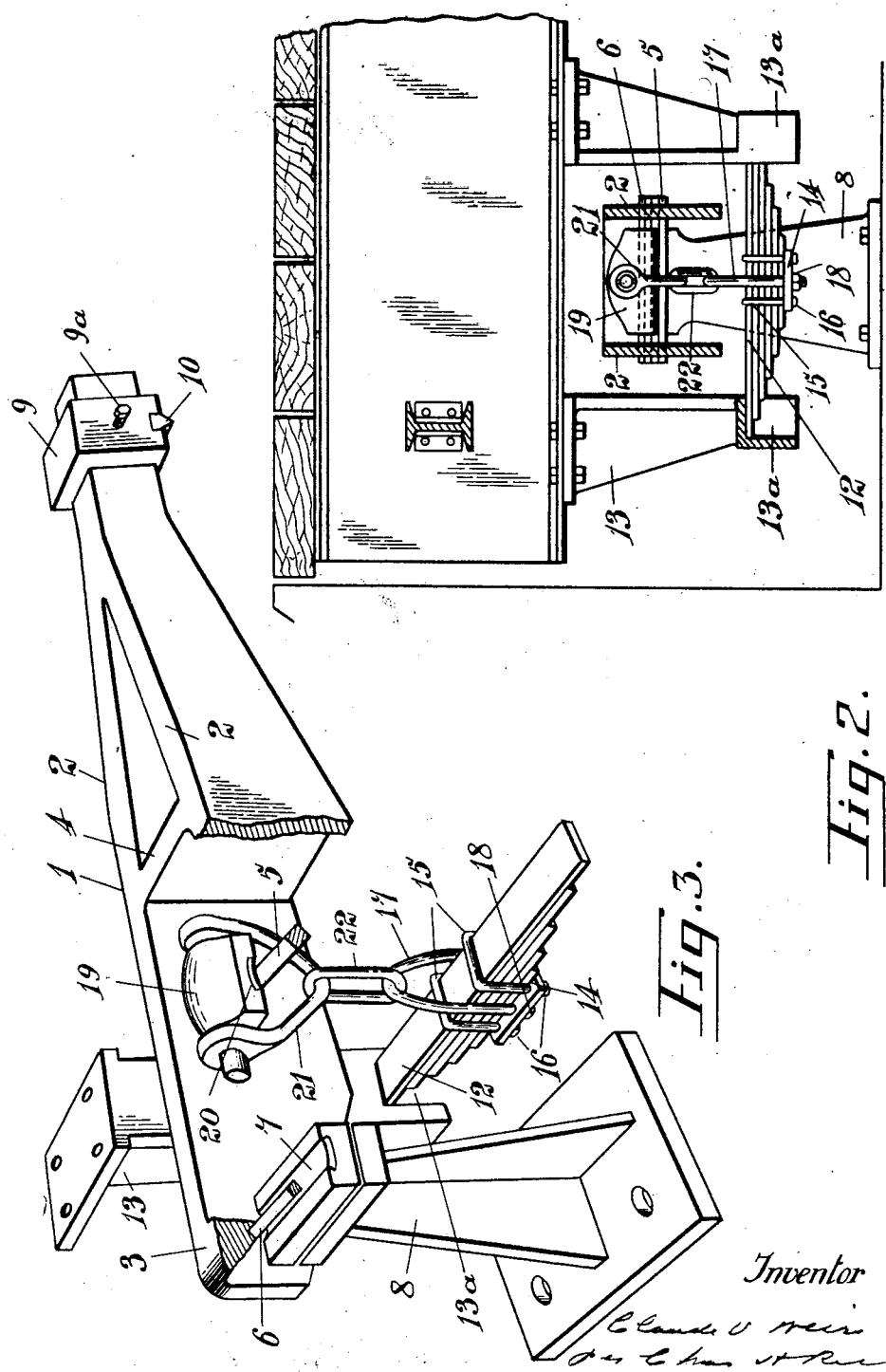

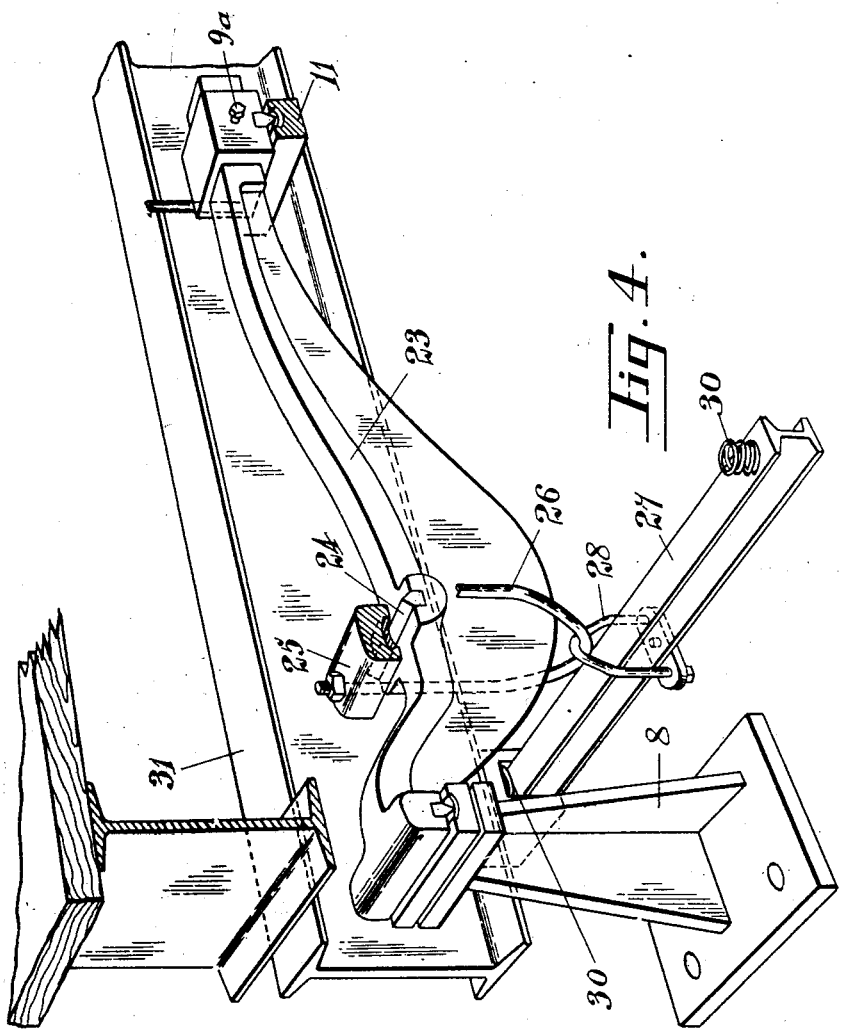

Patented May 21, 1929.

1,713,728

UNITED STATES PATENT OFFICE.

CLAUDE VAUGHAN WEIR, OF TORONTO, ONTARIO, CANADA.

SCALE.

Application filed November 11, 1927. Serial No. 232,491.

My invention relates to a lever mechanism for a scale, which will withstand the impact, and counteract the unequal weight distribution, of heavily loaded motor trucks on the scale platform, and it comprises a lever having a fulcrum bearing on a column or pedestal, a knife edge bearing supported by and extending transversely across it interjacent the fulcrum and its free end, and a resilient support for the scale platform suspended from the knife edge bearing by a flexible hanger which absorb or compensate for the shock of the impact when the vehicle passes on or off the platform, and allow it to reciprocate horizontally under all variations of impact and unequal weight distribution.

When a bifurcated lever is employed in the scale structure the side plates of the lever are connected by integral cross members, and the knife edge bearing extends across the lever between and is supported by them. The flexible hanger, for this construction, comprises a saddle seated on the knife edge bearing, between the side plates, a clevis pivotally connected with the saddle, a clevis for the resilient support, and a link connecting the clevis of the saddle with the clevis of the resilient support.

When a single lever is used the knife edge bearing is supported on the lever, and projects transversely beyond its opposite sides. The saddle in that case is mounted on the knife edge bearing and the saddle clevis straddles the lever and is rigidly connected to the saddle.

The resilient support may take the form of a leaf spring located beneath the lever and extending across it and beyond its outer side faces, or it may take the form of a rigid bar and in that case coiled springs are interposed between the bar and the depending platform members.

The platform members may take the form of depending legs or they may take the form of cross girders and in either case they are securely seated on the resilient support.

For an understanding of the invention reference is to be had to the following description and to the accompanying drawings, in which:

Fig. 1 is a cross sectional view of a scale constructed according to this invention, Fig. 2 is a fragmentary section taken at right angles to Fig. 1, Fig. 3 is a fragmentary perspective view of the lever mechanism, and Fig. 4 is a perspective view of a modification of the lever mechanism.

Like numerals of reference refer to like parts throughout the specification and drawings.

This invention is characterized by the structural details of the lever mechanism and only such other parts of the scale will be described or referred to as may be necessary to explain its purpose or operation. The type or shape of the lever is optional and its dimensions and mechanical strength are dependent on the weighing capacity of the scale and the strains to which it may be subjected.

The lever 1 shown in Fig. 3 is of the bifurcated type and comprises two converging side plates 2 connected by integral cross members 3 and 4. The cross member 3 is at or near the fulcrum end of the lever and the cross member 4 is intermediate the cross member 3 and the opposite or free end of the lever. Extending across the lever, between the members 3 and 4 and supported by the side plates 2, is a knife edge bearing 5 of the requisite mechanical strength to carry the maximum load imposed upon it.

In the construction shown in Figs. 1, 2 and 3, the bearing 5 takes the form of a hardened steel bar immovably set in the side plates 2 and may be rigidly connected with the side plates by any known expedient. At the fulcrum end of the lever is a hardened knife edge bearing 6 which is also set immovably in the side plates 2. Above this bearing and forming a rigid brace for it is the cross bar 3. The knife edge bearing 6 engages the cooperating bearing member 7, seated on the fulcrum column or pedestal 8, for the balancing movement of the lever. Movable on the lever, at or near the opposite end to the fulcrum, is an adjustable band 9 which carries the hardened knife edge bearing 10, for transmitting the load to the extension lever 11. The adjustment of the band 9 brings the bearing 10 into correct relation with the extension lever 11 and the adjustment is maintained by set screws 9ª entered through the band 9 for engagement with the lever 1.

Below the lever 1 is the resilient support 12 for the platform members 13, and as shown in Figs. 1, 2 and 3, this support comprises a leaf spring, extending across the lever and beyond the side plates 2. The support 12 is provided with a plate 14 secured to the spring by clips 15 having nuts 16, by which the plate and clips are tightened against the leaves. The plate 14 projects laterally beyond the spring and is apertured for the forks of a cleavis 17 which embrace the spring and are entered through the plate and secured to it by nuts 18. The adjustment of the nuts 18 on the forks of the clevis effect the adjustment of the hanger by which the platform can be brought to a correct level.

Above the knife edge bearing 5 is a saddle 19 having a hardened bearing 20 cooperating with the knife edge bearing 5. Straddling the bearing 5 is a clevis 21 pivotally connected with the saddle 19, and flexibly connected with the clevis 17 by a link 22. The saddle 19, clevis 21, link 22, and clevis 17, constitute a flexible hanger for the resilient support 12 but this flexible hanger may take other forms within the scope of the appended claims.

A modification of the lever and resilient support is shown in Fig. 4, in which the lever takes the form of a single bar 23 with the knife edge bearing 24 above it, the saddle 25 seated on the bearing, and the clevis 26 straddling the lever and rigidly connected to the saddle. The resilient support, as shown in Fig. 4, may consist of a rigid bar 27 provided with a clevis 28 suspended from the clevis 26. The bar 27 extends across and projects beyond both sides of the lever 23 and on the bar 27 at or near the ends are coiled springs 30 interposed between the bar and the platform members.

The platform members 13, as shown in Figs. 1, 2 and 3, may take the form of depending legs embracing the lever and seated at their lower extremities on the resilient support, or as shown in Fig. 4 they may take the form of cross girders 31 embracing the lever and seated on the support.

In the preferred construction, which is shown in Figs. 1, 2 and 3, the depending legs have box shaped recesses 13ª at their lower extremities in which the ends of the resilient support are entered and which maintain the assembly of the resilient support and platform members.

The foregoing structural arrangement relieves the knife edge bearings of the shock of the impact when the vehicle moves on or off the platform and compensates for the unequal load distribution on the vehicle.

Having thus fully described my invention what I claim as new and desire to secure by Letters Patent is:

1. A scale comprising a lever having a knife edge bearing extending transversely across and supported by it, a resilient support beneath and extending transversely across and beyond the lever, a flexible hanger for the resilient support, suspending it from the knife edge bearing, and a depending platform member at each side of the lever seated at its lower end on the resilient support.

2. In a scale, the combination of a bifurcated lever comprising two side plates connected by integral cross members, a knife edge bearing extending across the lever between and supported by the side plates, a resilient cross bar beneath the lever extending beyond the outer faces of the side plates, a flexible hanger for the resilient cross bar suspended from the knife edge bearing, and depending platform members embracing the bifurcated lever seated at their lower ends on the resilient cross bar.

3. In a scale the combination of a bifurcated lever comprising two side plates connected by integral cross members, a knife edge bearing extending across the lever between and supported by the side plates, a leaf spring beneath the lever, extending across it and beyond the outer faces of the side plates, a flexible hanger for the spring suspended from the knife edge bearing, and depending platform members embracing the bifurcated lever seated at their lower ends on the spring.

4. A scale comprising a lever having a knife edge bearing extending transversely across and supported by it, a depending platform member at each side of the lever, a support beneath and extending transversely across the lever on which is seated both of the depending platform members, a hanger for the support suspending it from the knife edge bearing comprising a saddle seated on the knife edge bearing, a clevis connected with the saddle, and a clevis for the support suspended from the saddle clevis.

5. A scale as claimed in claim 1, in which each depending platform member consists of a leg, having a box shaped recess at its lower extremity for the corresponding end of the resilient support.

Dated at the city of Toronto, in the county of York, and Province of Ontario, Dominion of Canada, this 4th day of November, A. D. 1927.

CLAUDE V. WEIR.